(12) United States Patent
Bialick et al.

(10) Patent No.: US 6,904,523 B2
(45) Date of Patent: Jun. 7, 2005

(54) METHOD AND SYSTEM FOR ENFORCING ACCESS TO A COMPUTING RESOURCE USING A LICENSING ATTRIBUTE CERTIFICATE

(75) Inventors: William P. Bialick, Clarksville, MD (US); Russell D. Housley, Herndon, VA (US); Charles R. J. Moore, Brisbane (AU); Duane J. Linsenbardt, San Jose, CA (US)

(73) Assignee: Spyrus, Inc., San Jose, CA (US)

( * ) Notice: Subject to any disclaimer, the term of this patent is extended or adjusted under 35 U.S.C. 154(b) by 0 days.

(21) Appl. No.: 10/195,059

(22) Filed: Jul. 11, 2002

(65) Prior Publication Data

US 2002/0184508 A1 Dec. 5, 2002

Related U.S. Application Data

(63) Continuation of application No. 09/264,339, filed on Mar. 8, 1999, now abandoned.

(51) Int. Cl.$^7$ ................................................ H04L 9/00
(52) U.S. Cl. .................................... 713/156; 705/59
(58) Field of Search ............................ 713/155, 156, 713/165, 169, 170, 201, 189; 705/59; 709/217

(56) References Cited

U.S. PATENT DOCUMENTS

| | | | |
|---|---|---|---|
| 4,919,545 A | 4/1990 | Yu | 380/25 |
| 5,164,988 A | 11/1992 | Matyas et al. | 380/25 |
| 5,339,403 A | 8/1994 | Parker | 395/425 |
| 5,412,717 A | 5/1995 | Fischer | 380/4 |
| 5,457,746 A | 10/1995 | Dolphin | 380/4 |
| 5,483,596 A | 1/1996 | Rosenow et al. | 380/25 |
| 5,659,616 A | 8/1997 | Sudia | 380/23 |
| 5,671,412 A | 9/1997 | Christiano | 395/615 |
| 5,677,953 A | 10/1997 | Dolphin | 380/4 |
| 5,703,951 A | 12/1997 | Dolphin | 380/25 |
| 5,825,883 A | 10/1998 | Archibald et al. | 380/25 |
| 6,047,242 A | * 4/2000 | Benson | 702/35 |
| 6,055,637 A | * 4/2000 | Hudson et al. | 713/201 |
| 6,105,069 A | * 8/2000 | Franklin et al. | 709/229 |
| 6,108,788 A | 8/2000 | Moses et al. | 713/201 |
| 6,128,740 A | 10/2000 | Curry et al. | 713/200 |

(Continued)

FOREIGN PATENT DOCUMENTS

| | | |
|---|---|---|
| EP | 0465016 | 1/1992 |
| EP | 0813132 | 12/1997 |
| EP | 0828208 | 3/1998 |
| WO | WO 98/58306 | 12/1998 |

OTHER PUBLICATIONS

Housley, Russell et al., "Metering: A Pre-Pay Technique," SPIE vol. 3022, Feb. 13, 1997, pp. 527–531.

(Continued)

Primary Examiner—Matthew Smithers

(57) ABSTRACT

A licensing attribute certificate enables a trusted computing base to enforce access to a computing resource by a computer application. The licensing attribute certificate can contain enforcement data which limits the use of the computing resource. The licensing attribute certificate can also contain information allowing for the tracking of licensing data about the use of the computing resource. The use of a licensing attribute certificate to enforce access to a computing resource can allow products to be fielded which have their capability limited to a specific subset of functions. The enforcement data, the licensing data, and the data limiting the application to a specific subset of functions are cryptographically bound to the computing resource using a licensing attribute certificate according to the invention. Prior to allowing access to the computing resource by the computer application, a trusted computing base strongly authenticates that usage via the licensing attribute certificate.

47 Claims, 15 Drawing Sheets

U.S. PATENT DOCUMENTS

| | | | | |
|---|---|---|---|---|
| 6,138,239 A | * | 10/2000 | Veil | 713/200 |
| 6,148,290 A | | 11/2000 | Dan et al. | 705/1 |
| 6,202,157 B1 | | 3/2001 | Brownlie et al. | 713/201 |
| 6,381,639 B1 | | 4/2002 | Thebaut et al. | 709/222 |
| 6,510,513 B1 | | 1/2003 | Danieli | 713/156 |
| 2002/0169954 A1 | | 11/2002 | Bandini et al. | 713/153 |

OTHER PUBLICATIONS

Hsu, Yung–Kao, "Development of an Intranet Security Infrastructure and Its Application," IEEE Comput. Soc. Proceedings of Wet Ice '98—IEEE Seventh International Workshop on Enabling Technologies: Infrastructure for Collaborative Enterprises, Jun. 17–19, 1998, pp. 334–339.

Grimm, Rudiger et al., "Security policies in OSI–management experiences from the DeTeBerkom project BMSec," Computer Networks and ISDN Systems, vol. 28, No. 4, Feb. 1, 1996, pp. 499–511.

Lopez, Lourdes et al., "Hierarchical Organization of Certification Authorities for Secure Environments," IEEE Computer Soc. Press. Proceedings of SNDSS '97: Internet Society 1997 Symposium on Network and Distributed System Security, Feb. 10–11, 1997, pp. 112–121.

Greck, E. et al., "Overview of Certification Systems: X.509, CA, PGP and SKIP", Aug. 1, 1998, MCG, pp. 1–18.

Karlton, Phil, "Proposal to add attribute certificates to TSL 3.1," Jul. 26, 1996, pp. 1–2.

* cited by examiner

METHOD AND SYSTEM FOR ENFORCING ACCESS TO A COMPUTING RESOURCE USING A LICENSING ATTRIBUTE CERTIFICATE

This continuation of application Ser. No. 09/264,339, filed Mar. 8, 1999, now abandoned.

BACKGROUND OF THE INVENTION

1. Field of the Invention

The present invention relates generally to the authorized use of computing resources by computer applications. More particularly, the present invention relates to use of a licensing attribute certificate (LAC) to provide cryptographic binding between a computing resource and attributes related to a computer application, and to provide strong authentication by a trusted computing base controlling the computing resource.

2. Background Information

In a typical untrusted computer environment, a computer application can use available computing resources with little or no authorization or accountability. Examples of such computing resources include a modem or network interface. Another example of such computing resources includes a cryptographic token, which provides cryptographic resources to the computer application.

FIG. 1a depicts a typical computer system 100 made up of several "layers" 101, with two layers 130 and 132 consisting of a number of different modules 102, 103, 104, and 105. Each layer represents a collection of one or more modules at a particular abstraction level in a hierarchy of software code development. Each module represents a collection of computer instructions which perform a particular operation on the data which the module receives, producing some data output from the module. At the top layer 130, module 102 can represent a computer application running on a computer of a user 115. Via a user interface in this example, module 102 receives input 110 from user 115. The input 110 could, for example, represent ordering and payment information in an electronic commerce transaction.

Similarly, module 103 receives data item 112, data item 114, and data item 116 as inputs. The module 103 processes the data items 112, 114, and 116, and produces data outputs 118 and 120. These outputs 118 and 120, in turn, become inputs for computing resource A 106. Computing resource A 106 then processes its data inputs 118, 120, 122, and 124 to produce resource output 126, which is returned to module 102.

In the example system shown in FIG. 1a, layer 130 might be written in a well known high-level language, such as C or C++. Layer 132 can comprise libraries of lower-level functions, that would be usable by other applications in addition to module 102. These libraries could also be written in a high-level language.

In general, layer 134 represents any atomic computing resources that process data. Layer 134 can be cryptographic computing resources, such as those found on a cryptographic token. Layer 134 can also be computing resources that send signals to hardware devices, such as a display or some other peripheral device. Layer 134 can also be computing resources that transform data received from user 115.

A cryptographic token provides the ability to perform cryptographic operations on data. Some examples of cryptographic operations include symmetric encryption (secret key) operations, asymmetric encryption (public key) operations, key exchange operations, hash operations, digital signature operations, and key wrapping operations.

FIG. 1b depicts an example of a system 150 of functional layers that contain computing resources specifically designed for providing cryptographic processing. This system, which does not contain the invention, can be contrasted with the system shown in FIG. 4, which does contain the invention. In the example shown in FIG. 1b, user 152 interacts with a user interface in the computer application 171 of application layer 160. In this example, computer application 171 represents the highest level of abstraction; that is, an interface with user 152. As a result of input 170 from user 152, computer application 171 generates inputs 172 and 174 for a mid-level application programmer interface (API) layer 162. In this example, the mid-level API layer 162 comprises two different mid-level libraries, cryptographic API library A 173 and cryptographic API library B 175. These API libraries 173 and 175 communicate with a low-level API library 177 in low-level API layer 164 via inputs 176 and 178. Finally, the low-level API library 177 communicates with the cryptographic resources via inputs 180 and 182 to software drivers comprising hardware token code stack 179 or software token code stack 181 in driver software level 166. Hardware token code stack 179 interfaces with hardware cryptographic token reader 183. Hardware cryptographic token reader 183 sends data over data path 184 to hardware cryptographic token 187 in order for the data to be cryptographically processed therein. The hardware cryptographic token 187 contains trusted computing base (TCB) 191 which is used to provide computing resources to computer application 171 in the form of cryptographic operations from cryptographic computing resource A 193. Another example of a TCB which can be used to provide cryptographic operations from cryptographic computing resource B 197 to computer application 171 in system 150 is TCB 195 made accessible via software token 189. Software token 189, consisting, for example, of a floppy disk, is accessed via software token code stack 181 and token reader 185, and contains the necessary information to allow computer application 171 to access the cryptographic operations made available via low-level API library 177.

Early cryptographic systems used a secret key approach to secure data. In these systems, each user had the same cryptographic key which was used for both encryption and decryption of the data. As a result, the key needed to be kept secret or else the system could be compromised (thus the name secret key cryptography). In contrast, relatively recent advances in cryptography have led to cryptographic systems which use a mathematically related pair of keys. In these systems, one key is kept private by the user, while the other is made public (thus the name public key cryptography). These key pairs allow for algorithms that provide confidentiality (via encryption); and authentication, integrity, and nonrepudiation (via digital signatures).

The deployment of public key cryptography, especially in a public key infrastructure (PKI), relies heavily on public key certificates. A public key certificate (or just "certificate") contains the public key of a user, along with information that allows a relying party to evaluate whether or not to trust a user's digital signature produced using the private key corresponding to that public key. In particular, the certificate contains the digital signature of a Certification Authority (CA). In general, the CA is a secure, standards-based, and trusted entity that provides certificate, token, user registration, and directory management services. In particular, the CA issues certificates to subscribers. A CA's signature on a certificate indicates that the CA has verified the identity of the user whose certificate it has signed, and the CA's signature also binds the identity of the user to the public key appearing in the certificate.

The X.509 standard of the International Telecommunication Union (dated June 1997) defines an "attribute certificate" as a "set of attributes of a user together with some other information, rendered unforgeable by the digital signature created using the private key of the certification authority which issued it." Thus, an attribute certificate contains information to supplement the identity information in a public key certificate.

In addition, the X.509 standard defines "strong authentication" as "[a]uthentication by means of cryptographically derived credentials". The X.509 standard discusses the property of some public key cryptosystems (PKCSs) in which the enciphering and deciphering steps can be reversed, and goes on to state that this property "allows a piece of information which could only have been originated by X, to be readable by any user (who has possession of [the public key of X]). This can, therefore, be used in the certifying of the source of information, and is the basis for digital signatures. Only PKCS which have this (permutability) property are suitable for use in this authentication framework." In other words, strong authentication can only be achieved with a PKCS in which the public key reverses the transformation accomplished using the private key, and vice versa.

The Trusted Computer System Evaluation Criteria from the United States Department of Defense (DOD) defines a TCB as "the totality of protection mechanisms within a computer system . . . the combination of which is responsible for enforcing a security policy. It creates a basic protection environment and provides additional user services required for a trusted computer system." An appropriately designed cryptographic token can, for example, contain a TCB. Appropriate design might include features such as a tamper proof case, nonmodifiable firmware, and zeroization of sensitive data upon intrusion detection. A secure operating system is another example of a TCB.

In the past, systems have been suggested which provide access control over various distributed computer resources. For example, in U.S. Pat. No. 5,339,403 issued to Parker, a system is described which requires a user to present a privilege attribute certificate to a computer application in order to access that application. However, the system according to Parker assigns the privilege attribute certificate to the user, only providing access control over the user to some subset of target computer applications. The system according to Parker does not provide strong authentication as the means for allowing access from a computer application to a computing resource. Furthermore, the system according to Parker utilizes a very complex shared secret (i.e. secret key) approach. The Parker approach relies upon encryption of the privilege attribute certificate using the shared secret key. A secret key system contains inherent key management problems and key compromise problems. In particular, a purely secret key system has no recovery mechanism following a compromise. The only way to recover (i.e. the only way to again provide security after compromise of a secret key) is via a physical redistribution of secret key material.

In addition, prior systems have been developed which provide access control over portable data storage media in a manner which allows tracking the usage of certain data. For example, commonly owned U.S. Pat. No. 5,457,746 issued to Dolphin on Oct. 10, 1995, describes a system which allows a publisher to define and enforce attributes related to encrypted files stored on external media. The attributes in this system could relate to such things as usage of particular data, time-related usage of a resource, or number of log-ons.

For many reasons, it is desirable to control the use of computing resources by a computer application through the use of strong authentication. For example, certain computing resources available on cryptographic tokens, if accessible by the computer application, would render the token unable to be exported from certain countries (such as the United States) unless restricted to use by approved computer applications. If those cryptographic operations could be successfully limited to use by approved computer applications using strong authentication, the cryptographic token could then be exported.

Similarly, it may be desirable to limit the accessibility to cryptographic operations contained in a cryptographic token for licensing reasons, which would require a metering of those operations. For example, a provider of cryptographic products might desire to limit access to operations on a cryptographic token to those entities who have properly licensed those operations from the provider. Alternatively, it may be desirable for developers of software products to control accessibility to their products using strong authentication techniques provided by the use of an LAC, in conjunction with separate computing resources.

SUMMARY OF THE INVENTION

According to the invention, a licensing attribute certificate (LAC) enables strong authentication techniques to be utilized for enforcing access to computing resources, via the use of standards-based public key techniques. Enforcing can include, for example, controlling access to computing resources, metering usage of computing resources, selectively enabling certain functions available from computer resources, or any combination of these and other functions. The LAC can contain information allowing for the tracking of licensing data about the use of computing resources. Those computing resources can be contained within a trusted computing base (TCB). The TCB can be in any of a number of forms, including contained within a cryptographic token or a secure operating system. The LAC can further contain information which limits the use of the available computing resources. This would allow products to be fielded, such as cryptographic tokens which contain cryptographic computing resources, which have their capability limited to a specific subset of functions. The use of a LAC in accordance with the invention can provide a cryptographically strong way of limiting access by a computer application to a specific subset of functions.

In one embodiment of the invention, a computer application developer receives a LAC from a vendor of a computing resource. A vendor can include any person or entity which provides computing resources. The developer embeds the LAC, containing a vendor's digital signature, into a computer application. The public key corresponding to the vendor's private key can be built in to the software library that provides the interface between the computer application and the TCB. Alternatively, the public key corresponding to the private key of the vendor can be built in to the TCB containing computing resources.

In yet another embodiment, separate public keys can be built in to both the software library and the TCB. When the computer application attempts to use a computing resource within the TCB, the library seeks to verify a first digital signature of the vendor and the TCB seeks to verify a second digital signature of the vendor. In addition to checking that both of the digital signatures are valid, checks could be made on the enforcement data within the licensing attribute certificate to determine whether access to the computing resources within the TCB can take place.

This invention provides a method for enforcing access by a computer application to a computing resource controlled by a trusted computing base, using standards-based public key techniques. The invention uses strong authentication to enforce that access control. The invention thus overcomes the complexities in the data exchanges involved in prior art systems. The invention also provides strong authentication in the use of a computing resource by a computer application, and eliminates the security risks particularly associated with systems which implement secret key approaches. The invention also provides a method for tracking usage of a computing resource using a LAC. Furthermore, the invention provides a method for allowing computer application developers to control access to their products via use of a LAC. In addition, the invention provides a method for restricting the usage of a computing resource to authorized functions.

DETAILED DESCRIPTION OF THE INVENTION

According to the present invention, a method and system for cryptographically binding a computing resource and a licensing attribute certificate (LAC) allows only authorized usage of the computing resource. The computing resource can, in one embodiment, be located within a trusted computing base (TCB). In another embodiment, the computing resource can be located outside of the TCB. In either case, the operations available from a computing resource cannot be accessed without a cryptographic verification by the TCB of the computer application's use of that computing resource. In a further particular embodiment, a LAC is used to provide strong authentication of a computing resource by a cryptographic token via a digital signature.

Figure 1A:
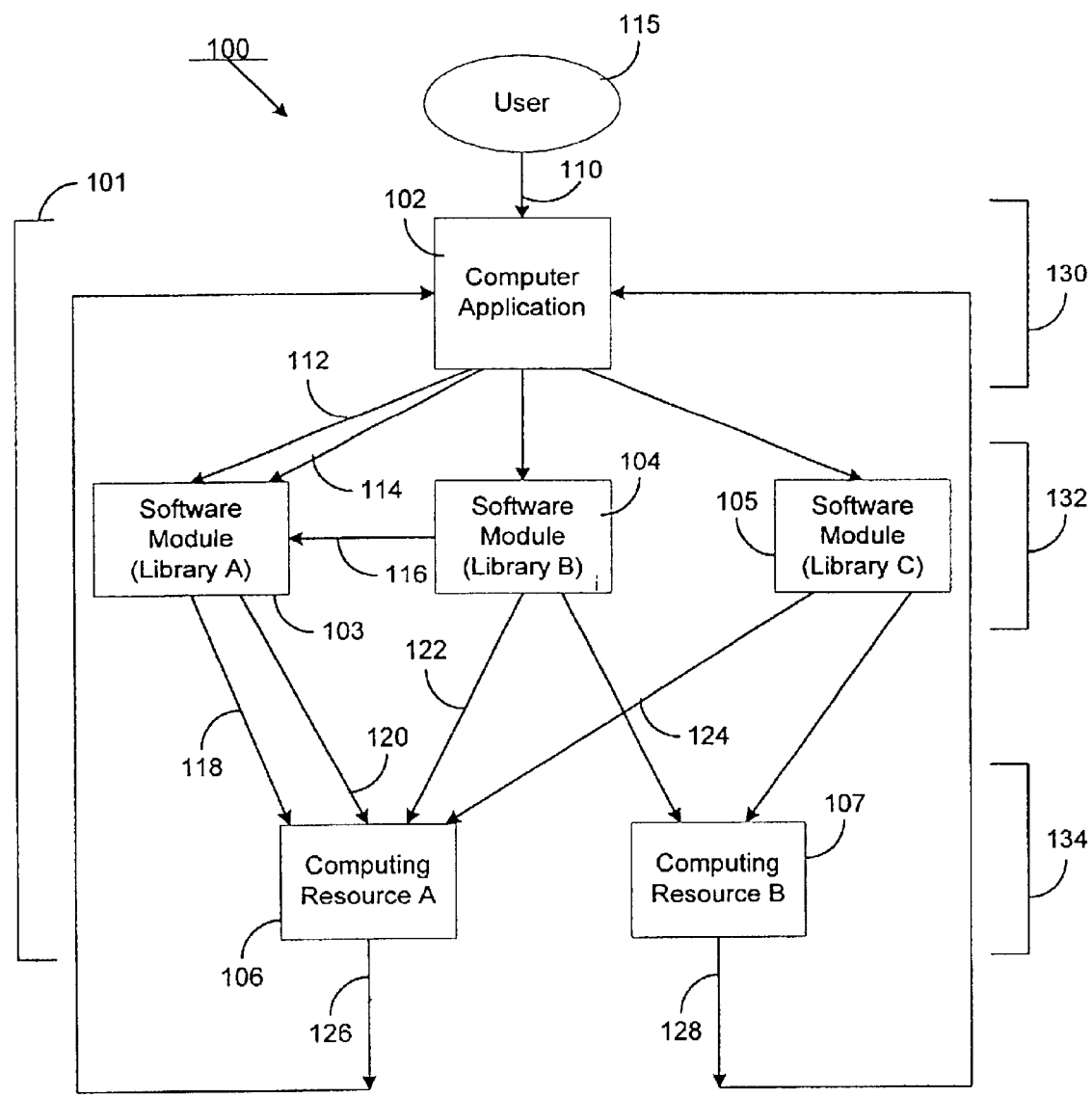
FIG. 1a and FIG. 1b depict the arrangement of software modules in layers, including software layers that contain particular elements for providing cryptographic processing.
Figure 1B:
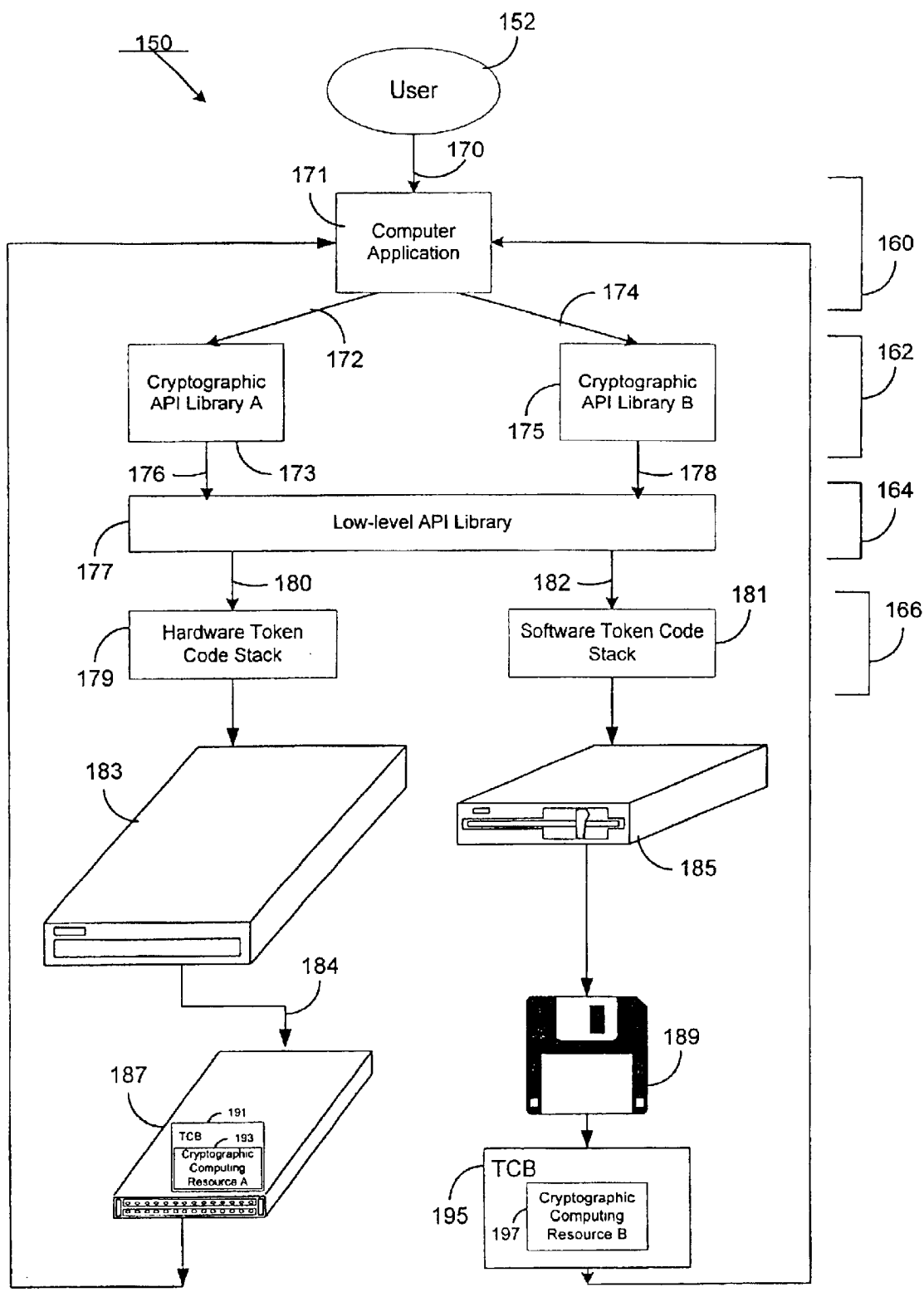
Figure 2:
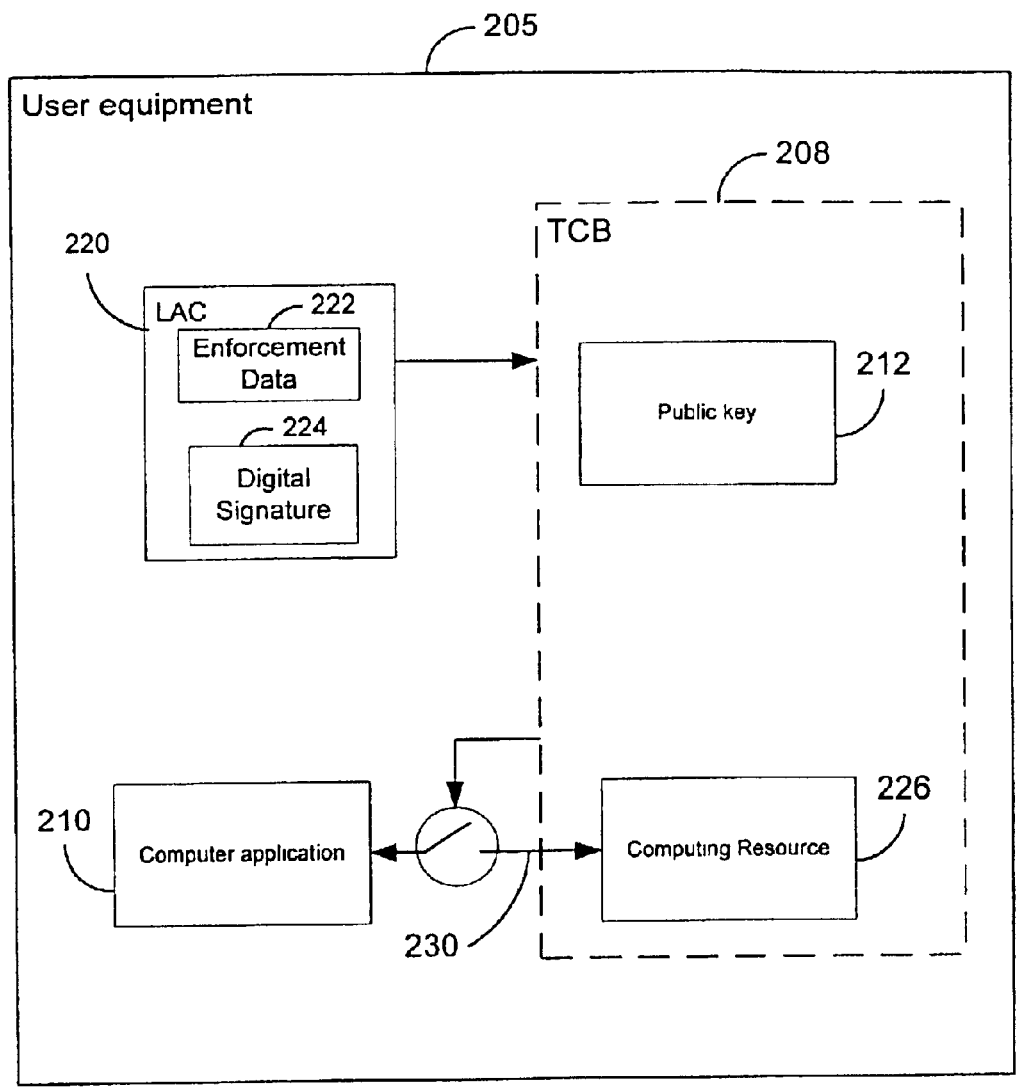
FIG. 2 depicts a basic architectural diagram showing a licensing attribute certificate that has been installed in equipment belonging to a user.

FIG. 2 depicts a basic system involving a LAC, according to the invention. User equipment 205 contains TCB 208, computer application 210, and LAC 220. User equipment 205 can include any type of computational device. Some examples include a personal computer, a personal digital assistant, or a machine with embedded computing capability. In general, user equipment represents any equipment used by a person or other entity (such as a corporation) that contains at least one computer application and at least one computing resource.

LAC 220 in FIG. 2 contains attribute information about computing resource 226, in the form of enforcement data 222. Enforcement data 222 facilitates enforcement of the use of the computing resource and can contain, for example, information about how and when the computing resource can be used. Enforcement data 222 can further contain information about what operations available from the computing resource can be used. LAC 220 also includes digital signature 224 computed using a private key.

TCB 208 in FIG. 2 contains computing resource 226, to which TCB 208 controls access, as represented by the switch in data path 230. TCB 208 also contains a public key 212, corresponding to the private key that was used to compute digital signature 224. Prior to computer application 210 gaining access to computing resource 226, TCB 208 must authenticate LAC 220 using public key 212. If the authentication of LAC 220 succeeds, TCB 208 will permit computer application 210 to access computing resource 226 along data path 230.

Figure 3A:
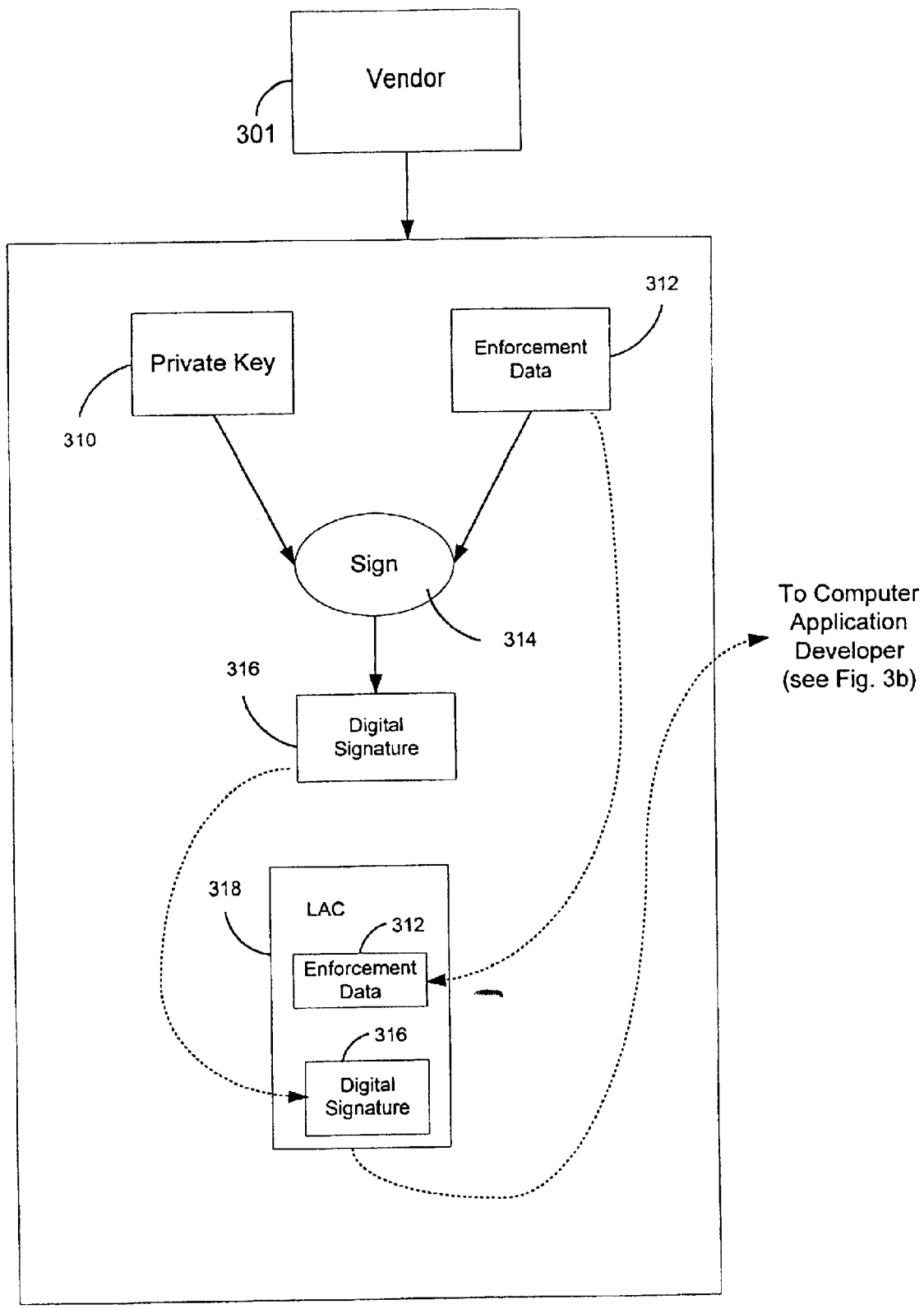
FIG. 3a, FIG. 3b, and FIG. 3c depict a method, according to the invention, of using a licensing attribute certificate to cryptographically bind information about a computer application and computing resources contained within a trusted computing base.

FIG. 3a depicts a method according to the present invention as applied to enforcement of authorized usage (e.g. licensing) of computing resources. Other applications of the invention can include, for example, exportability compliance or allowing selective usage of a computing resource.

Figure 3B:
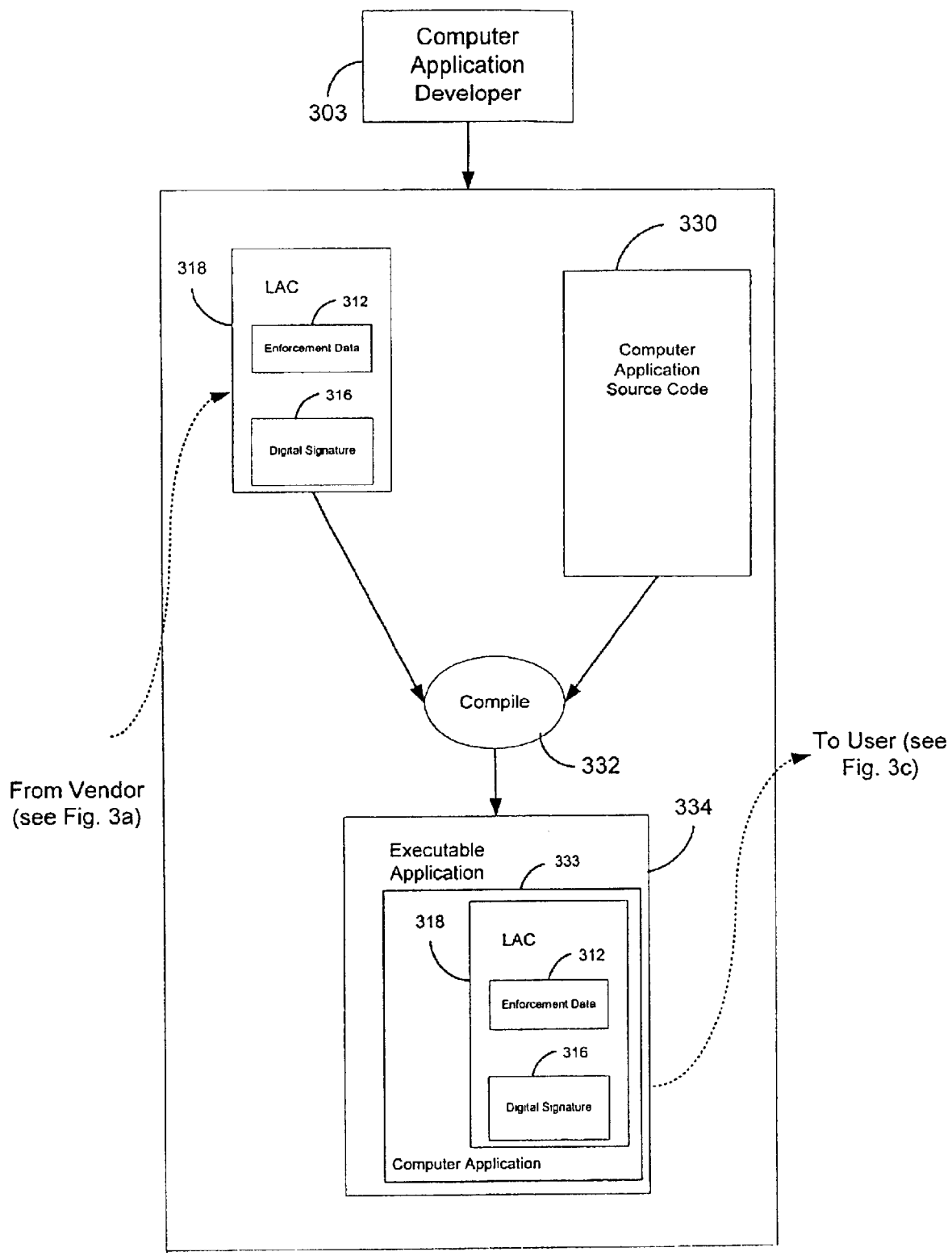

In FIG. 3a, vendor 301 of a computing resource 360 (shown in FIG. 3c) first produces enforcement data 312 that can, for example, correspond to particular rights afforded to a specific computer application developer 303 (shown in FIG. 3b). For example, the vendor of a computing resource might wish to limit the access to that computing resource to only a certain application. Alternatively, the vendor of the computing resource might wish to grant access to a subset of all of the functionality available from the computing resource. For example, where the computing resource is a hardware cryptographic token, the vendor might wish to only allow digital signature operations to be executed and would therefore need to disallow encryption operations.

In FIG. 3a, vendor 301 uses its private key 310 to compute digital signature 316 on enforcement data 312 using sign process 314. Sign process 314 (as well as other sign processes discussed herein) can be implemented using any of the well understood techniques for computing a digital signature. For example, the Digital Signature Algorithm, as specified in Federal Information Processing Standard Publication (FIPS PUB) 186 could be used to calculate digital signature 316. Alternatively, the RSA algorithm could be used.

Digital signature 316, corresponding to the particular computing resource 360, is combined with enforcement data 312 to form LAC 318. Vendor 301 then transmits LAC 318 to computer application developer 303. The transmission of LAC 318 to computer application developer 303 can occur using any methods and apparatus, including both networked and non-networked approaches. The LAC could be sent via a network, such as, for example, a Local Area Network (LAN), a Wide Area Network (WAN), or via the Internet. Transmission methods can include such things as, for example, electronic mail from the vendor to the computer application developer. Alternatively, the LAC can be posted on a bulletin board system (BBS), or can be stored in a directory of a computer system by the vendor and retrieved by the application developer using any type of retrieval technique, such as, for example, Telnet.

In FIG. 3b, computer application developer 303 generates computer application source code 330, which is combined with LAC 318. Computer application source code 330 and LAC 318 can be combined by using compile process 332, which creates an association between the computer application source code 330 and LAC 318. In another embodiment, a computer application and a LAC can be combined by providing an entry in a system registry of a computer operating system.

In FIG. 3b, the compilation of computer application source code 330 and LAC 318 generates an executable application 334 which can contain computer application 333 with LAC 318 embedded within it. Once compiled, the executable application 334 can be made available for distribution to users.

Figure 3C:
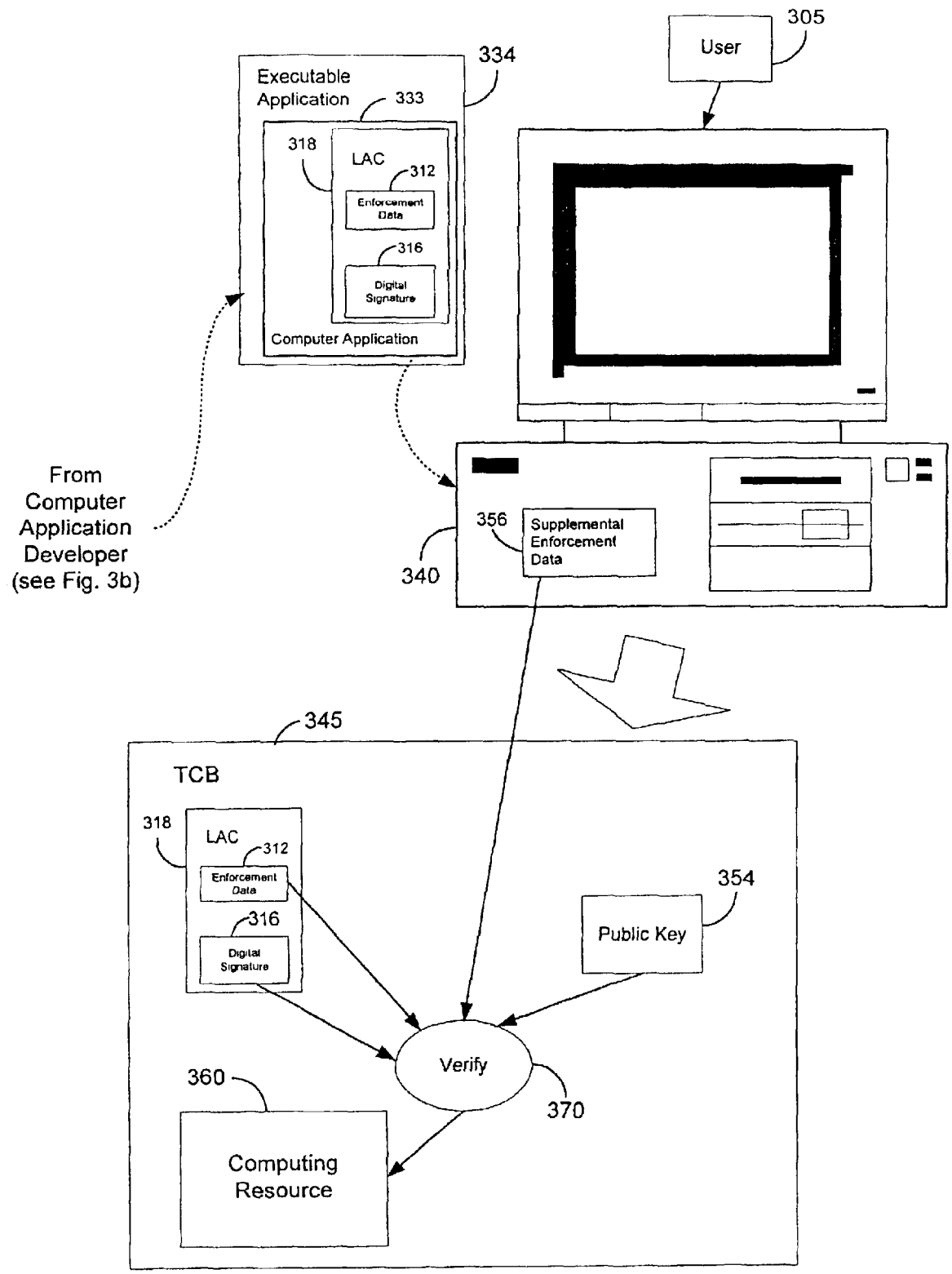

In FIG. 3c, user 305 can acquire the executable application 334 (which, in this example, contains the version of computer application 333 that can be executed on a computer) through any of several means including, for example, retail store purchase, electronic purchase (e.g., via the Internet), or any other software distribution mechanism. User 305 can make a purchase of, for example, a CD-ROM containing executable application 334, or can purchase and then download executable application 334 electronically. User 305 loads executable application 334 onto the user's computer 340 and runs executable application 334. In this example, executable application 334 needs to utilize computing resource 360 contained within TCB 345 (which can be contained within computer 340).

However, in order to gain access to computing resource 360, digital signature 316 contained within LAC 318 must be verified by TCB 345. TCB 345 performs verify process 370 using public key 354 in combination with enforcement data 312 to verify digital signature 316. The success of verify process 370 means that digital signature 316 in LAC 318 is valid. In addition, supplemental enforcement data 356, which may be contained in a database within computer 340 (i.e. external from the LAC), could be utilized to provide further control over accessibility to computing resource 360 as further described with reference to FIG. 10. Once LAC 318 is validated, executable application 334 being used by user 305 will then have access to computing resource 360.

In order to verify digital signature 316, TCB 345 must have public key 354. In one embodiment, depicted in FIG. 3c, vendor 301 can embed public key 354 in TCB 345. In an alternative embodiment, TCB 345 can receive public key 354 via a separate X.509 identity certificate path which is transmitted along with LAC 318.

Figure 4:
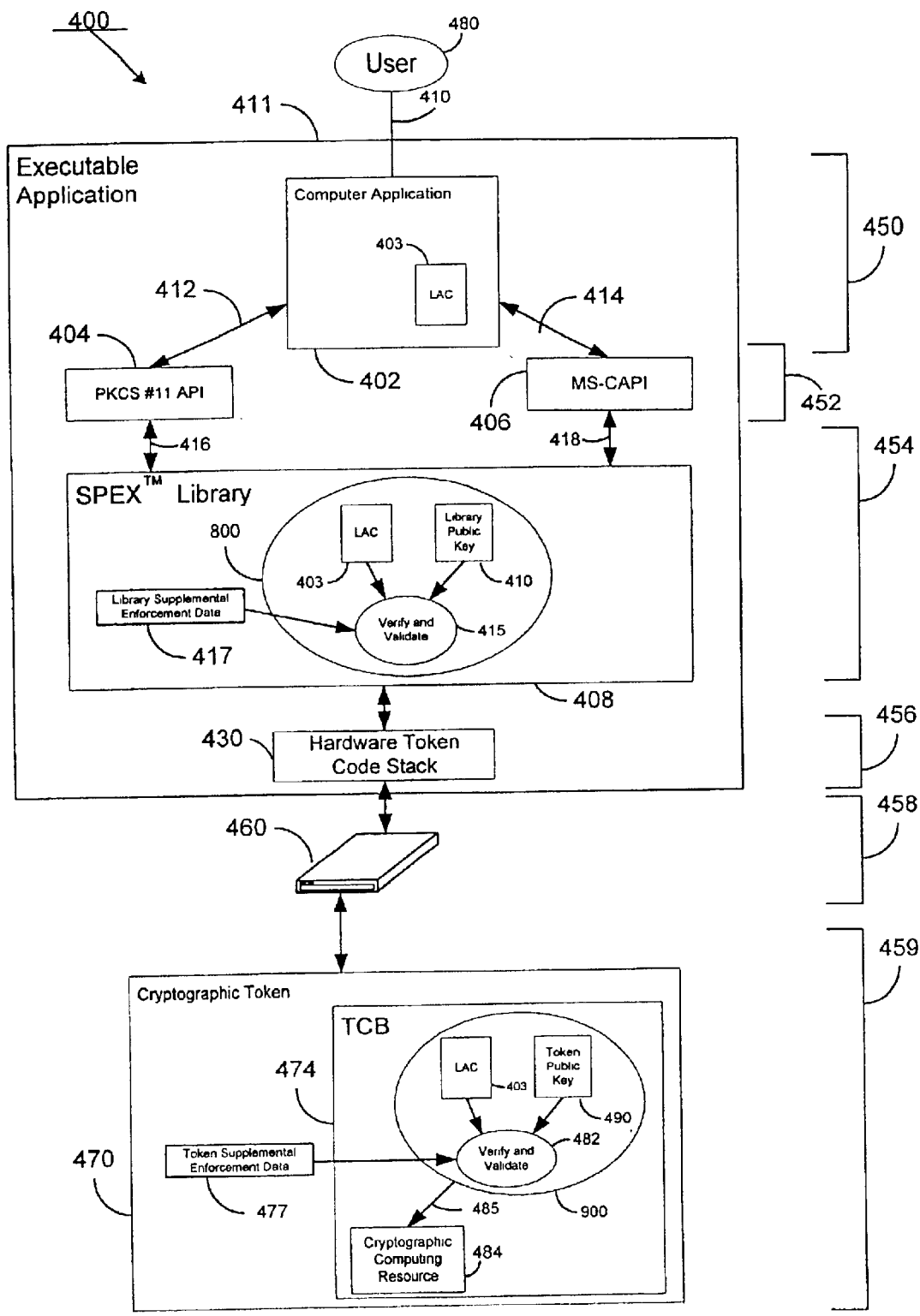
FIG. 4 depicts an example, according to the invention, of the cryptographic binding between a computer application and a trusted computing base which provides cryptographic resources.

FIG. 4 depicts a system 400 according to one embodiment of the invention which includes computing resources specifically designed for providing cryptographic processing. This embodiment represents one aspect of the SPYRUS S2CA, made and sold by SPYRUS, Inc. of Santa Clara, Calif., which is a secure, standards-based, and trusted certification authority (CA) that provides certificate, token, user registration, and directory management services.

In system 400 in FIG. 4, user 480 installs and runs executable application 411 on the user's computer. Executable application 411 can contain a number of different types of computer functionality, including such things as user interfaces, software libraries, and device drivers. In this example, the executable application 411 can contain LAC 403 which can be embedded in computer application 402. Also included in executable application 411 can be executable libraries, including PKCS #11 application programmer interface (API) 404 and Microsoft CryptoAPI (CAPI) 406. PKCS #11 is a nonproprietary, technology-neutral programming interface for cryptographic tokens such as smart cards and PCMCIA cards. CAPI is an interface that allows developers to build applications that use system-level certificate management and cryptography.

Computer application 402 communicates with PKCS #11 API 404 via data path 412 and with CAPI 406 via data path 414. Upon execution of particular instructions in either PKCS #11 API 404 or CAPI 406 which require functionality contained within cryptographic computing resource 484, LAC 403 can be passed via either data path 416 or data path 418 to the vendor specific library, such as the SPYRUS Extensions (SPEX) library 408.

In FIG. 4, SPEX library 408 performs library authorization 800 which can include using library public key 410, library supplemental enforcement data 417, and LAC 403 in verify and validate process 415. Further detail on library authorization 800 can be found in FIG. 8. The library authorization step provides an interim level of enforcement that does not involve a cryptographic token at all. This can be useful, for example, for minimizing the number of operations to be performed by the computing resources. As long as verify and validate process 415 succeeds, SPEX library 408 will be permitted to communicate with hardware token code stack 430, in attempting to make use of cryptographic computing resource 484. In this example, cryptographic token 470 contains cryptographic computing resource 484 which SPEX library 408 accesses via hardware token code stack 430 and smart card reader 460.

In this embodiment, control of the use of the cryptographic operations within the cryptographic computing resource 484 occurs within the boundaries of TCB 474 which is contained within cryptographic token 470. These cryptographic operations can be carried out on a cryptographic token. For example, a LYNKS PCMCIA card or a Rosetta smart card, both made and sold by SPYRUS, Inc. of Santa Clara, Calif., provides all of the above mentioned cryptographic operations to a computer application. Other examples of a hardware cryptographic token include a separate hardware board inside of a computer or an external hardware peripheral device. Alternatively, these cryptographic operations can be carried out via the use of a software cryptographic token, which can comprise a computer processor executing instructions and accessing data stored on a data storage device such as a floppy disk. For example, the software version of the Fortezza™ cryptographic token, also made and sold by SPYRUS, Inc. of Santa Clara, Calif., provides all of the above mentioned cryptographic operations to a computer application.

Prior to allowing any use of the cryptographic operations available in the cryptographic computing resource 484, TCB 474 performs token authorization 900 (described further below with respect to FIG. 9) which includes using token public key 490, token supplemental enforcement data 477, and LAC 403 in verify and validate process 482. The success of verify and validate process 482 confirms the cryptographic binding between cryptographic computing resource 484 and LAC 403. This allows TCB 474 to enforce the proper use of the cryptographic operations contained in cryptographic computing resource 484 by computer application 402.

Figure 5:
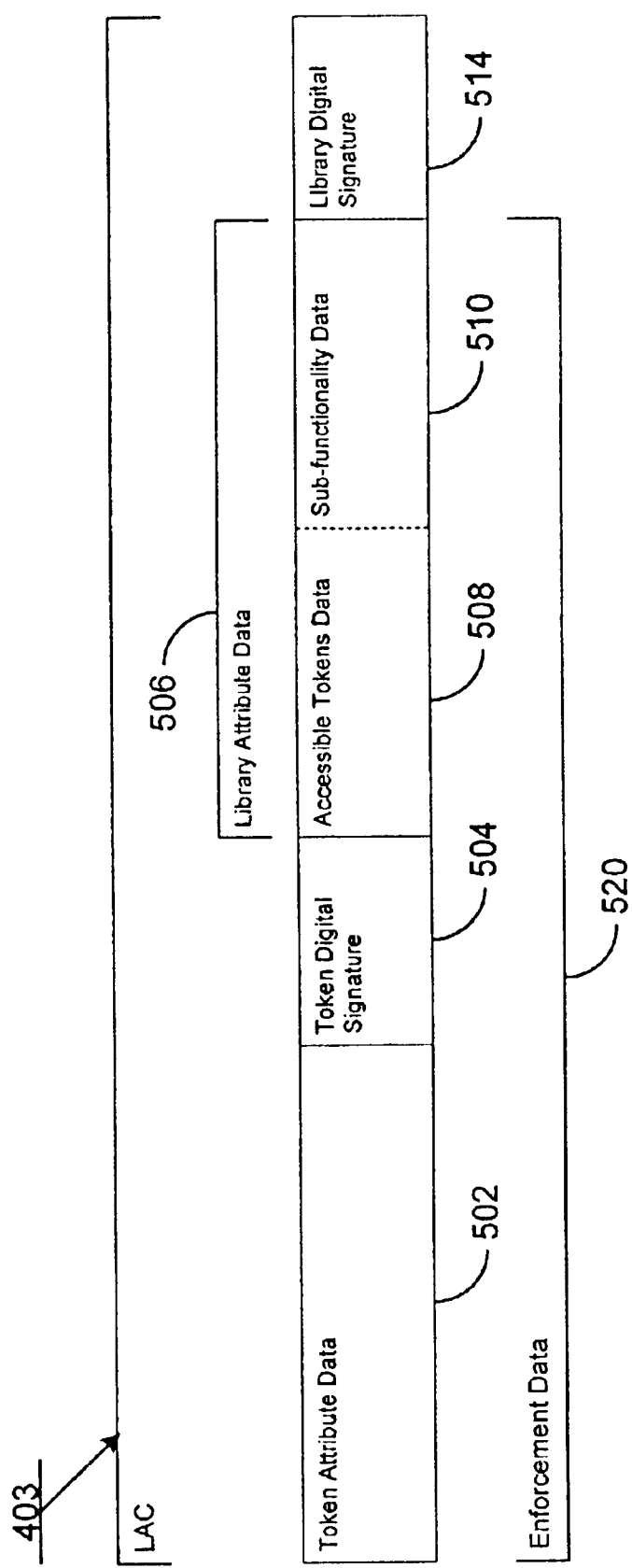
FIG. 5 depicts the contents of one embodiment of a LAC.

The enforcement of the proper use of the cryptographic operations contained in cryptographic computing resource 484 can occur via the enforcement data contained in LAC 403. Enforcement data permits enforcement of various conditions represented by the data. Enforcement data can, for example, be defined such that computing resources are only available for a specified number of uses, or such that only certain functions within the computing resources are available. The bit pattern in the LAC in FIG. 5 represents one embodiment of the data used to provide enforcement. In another embodiment, a LAC can be implemented using the X.509 attribute certificate format.

LAC 403 in FIG. 5 contains enforcement data 520 which can include attribute data associated with both cryptographic token 470 and SPEX library 408. Token attribute data 502 can, for example, identify the cryptographic operations on token 470 which are available to computer application 402 via SPEX library 408. Token digital signature 504 can be used by token 470 to validate token attribute data 502 and to enforce the proper use of the cryptographic operations by computer application 402. Library attribute data 506 can represent the functionality available to computer application 402 via SPEX library 408. Library attribute data 506 can be further logically divided into accessible tokens data 508 and sub-functionality data 510. These can allow even finer granularity to be defined for the subset of functions identified by library attribute data 506. For example, sub-functionality data 510 can be used in enforcing the available SPEX library functions such as, for example, limiting the functions available to computer application 402 to only encryption and decryption, but not authentication.

In addition to the attribute data, LAC 403 in FIG. 5 contains library digital signature 514. Library digital signature 514 can allow the SPEX library 408 to validate the LAC, and thereby control the availability of the library's functions.

Figure 6:
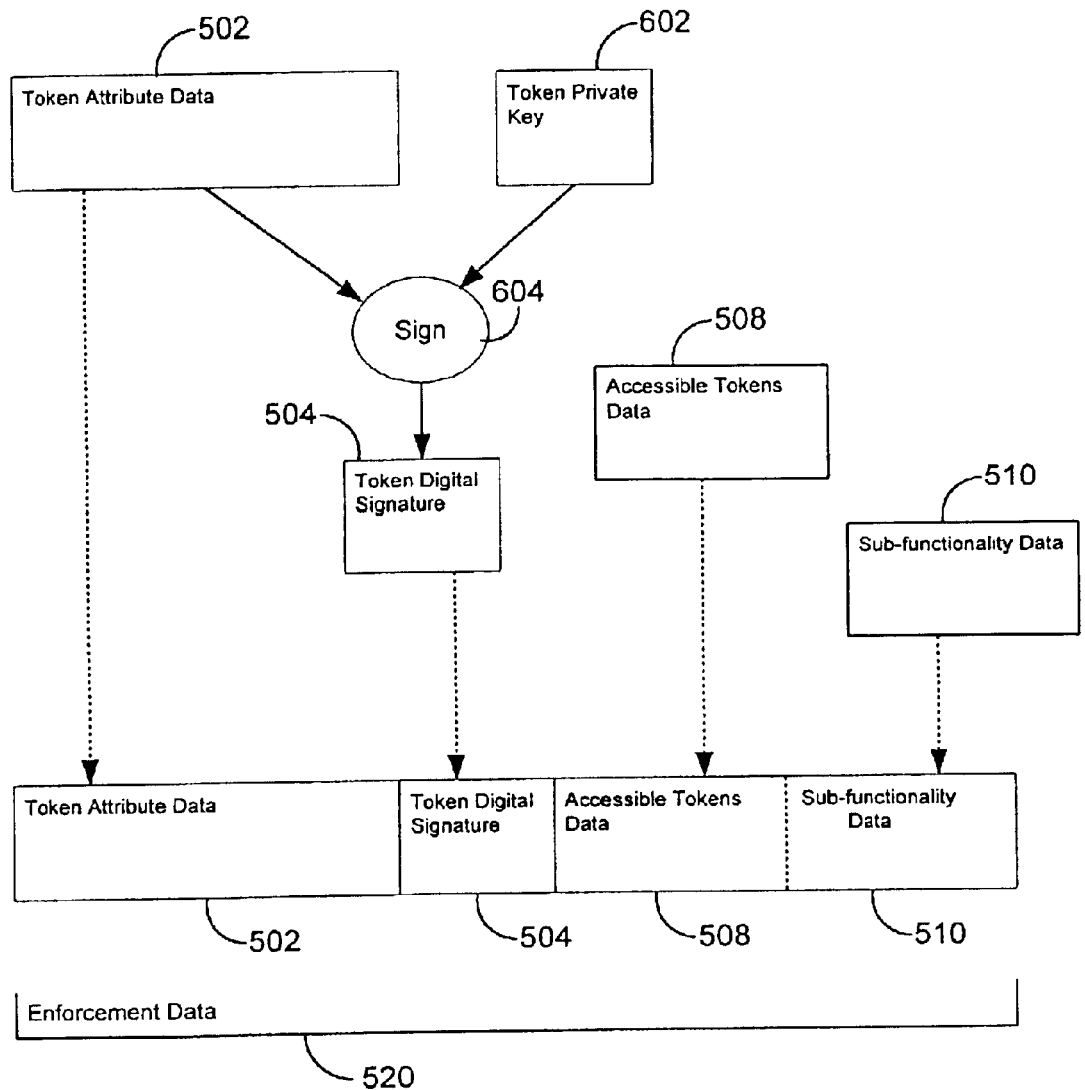
FIG. 6 depicts a process, according to the invention, of producing the token related information in the licensing attribute certificate.

FIG. 6 depicts a first step in the assembly of LAC 403 according to an embodiment of the invention. First, the computing resource vendor generates token attribute data 502 associated with the particular computer application for which the LAC is being created. Once token attribute data 502 has been determined, the vendor uses token private key 602 to digitally sign token attribute data 502 using sign process 604 which produces token digital signature 504.

Next, the vendor specifies information that determines the accessibility to the functions on the token. In the LAC 403, accessible tokens data 508 represents this information. The vendor of cryptographic tokens can define, for example, accessible tokens data 508 such that access to the computing resources would be limited to only those resources on that vendor's cryptographic tokens. After accessible tokens data 508 has been generated, the vendor then sets sub-functionality data 510 which can allow even finer granularity enforcement of the available resources. Once assembled, token attribute data 502, token digital signature 504, accessible tokens data 508, and sub-functionality data 510 comprise enforcement data 520.

Figure 7:
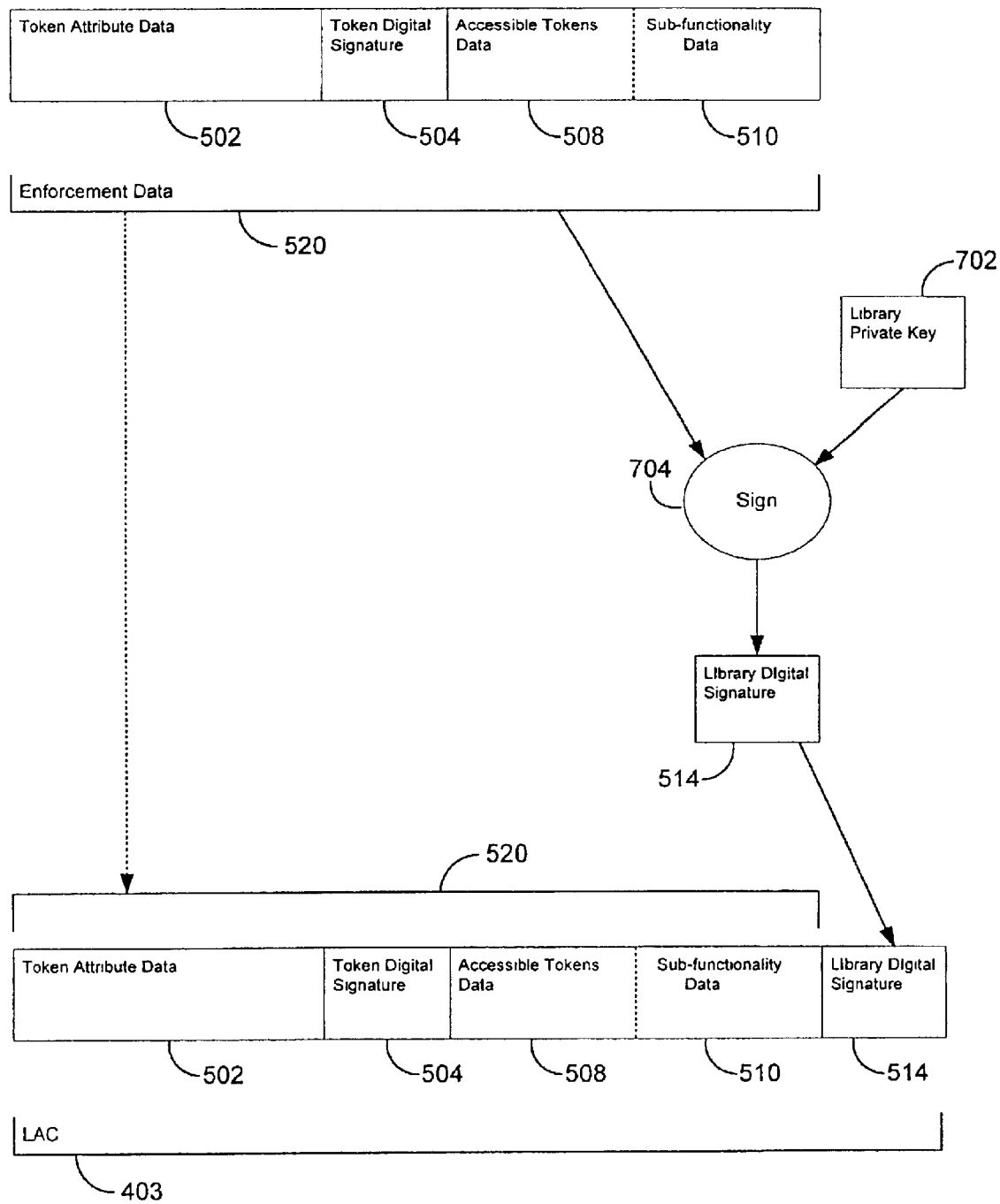
FIG. 7 depicts a process, according to the invention, of producing the library related information in the licensing attribute certificate.

FIG. 7 depicts a subsequent step in the assembly of LAC 403 in the present embodiment. Once all of the enforcement data 520 associated with the token and the library has been generated for LAC 403, the vendor uses a library private key 702 to digitally sign enforcement data 520 using sign process 704. The result is library digital signature 514, which is then appended to enforcement data 520. The overall data assembly, consisting of token attribute data 502, token digital signature 504, accessible tokens data 508, sub-functionality data 510, and library digital signature 514 comprise LAC 403.

It may be desirable to use two different key pairs (each consisting of a public and a private key) for the two signing processes 604 and 704 in FIG. 6 and FIG. 7, respectively. This means that token private key 602 in FIG. 6 and library private key 702 in FIG. 7 are different. This may be the case, for example, if the vendor of the token differs from the vendor of the library. Alternatively, the two key pairs (and thus the two private keys 602 and 702) can be the same. This may be the case, for example, if one vendor distributes both the token and the library.

Figure 8:
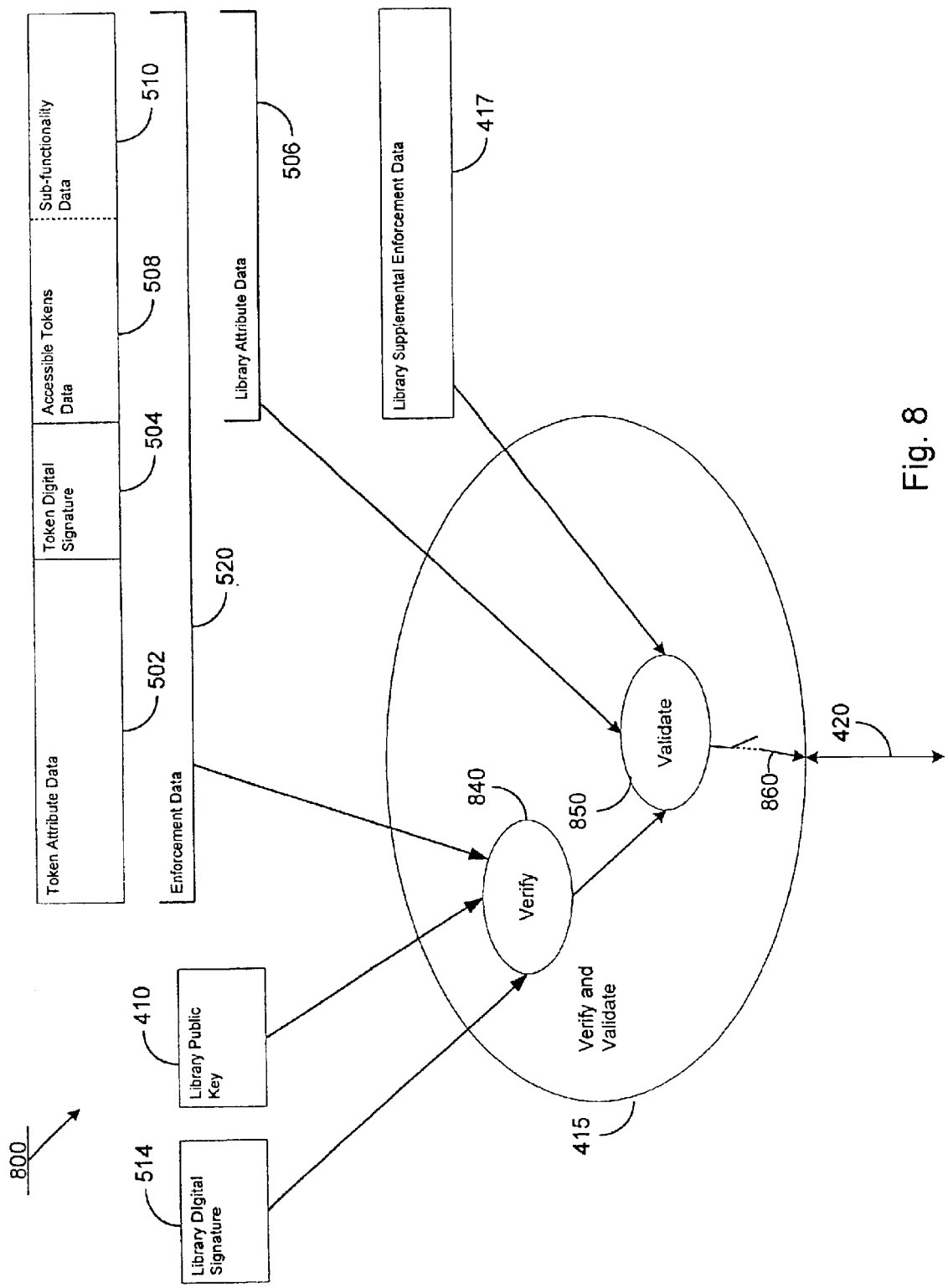
FIG. 8 depicts a library enforcement process, according to the invention.

FIG. 8 illustrates library authorization process 800 performed by SPEX library 408, as discussed generally above in regards to verify and validate process 415 shown in FIG. 4. Upon receiving LAC 403, SPEX library 408 separates library digital signature 514 from the remainder of LAC 403. The enforcement data 520 is input to verify process 840, along with library digital signature 514 and library public key 410. If the library digital signature 514 is properly verified, the library 408 permits processing to continue. If the library digital signature 514 is not properly verified, SPEX library 408 notifies computer application 402 that an error has occurred. If an error does occur, the library can take a variety of courses of action such as using an alternate resource.

Once library digital signature 514 has been verified, the library 408 checks library attribute data 506 against library supplemental enforcement data 417. This can, for example, determine whether the library 408 is permitted to access the token or tokens designated in the accessible tokens data 508 and determine whether library 408 can perform the particular operations designated in sub-functionality data 510. If the validation of either accessible tokens data 508 or sub-functionality data 510 fails, data path 860 will not be enabled, which will prohibit the library 408 from further communications with the cryptographic token 470.

Figure 9:
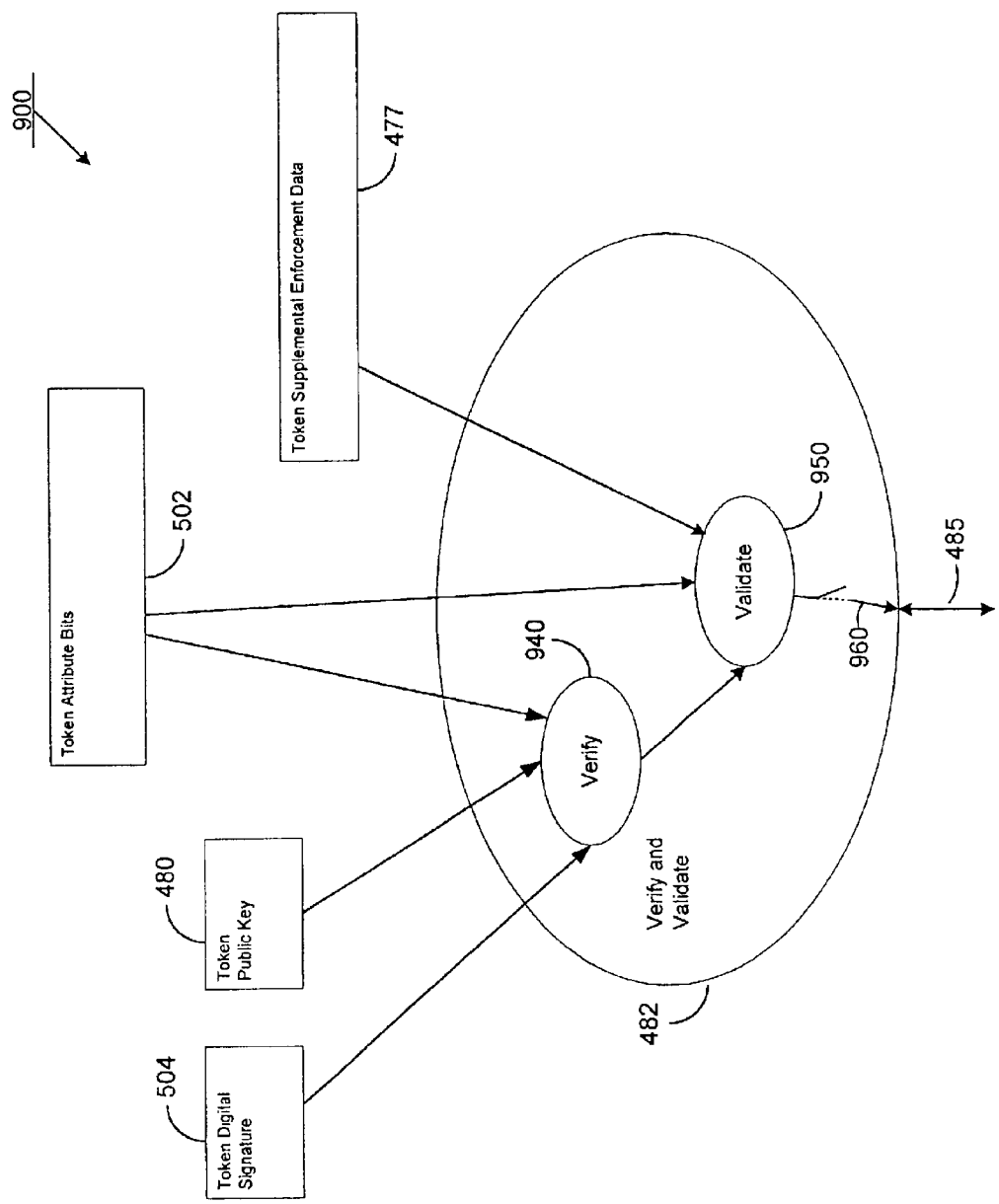
FIG. 9 depicts a token enforcement process, according to the invention.

FIG. 9 illustrates token authorization 900 performed by token 410, as discussed generally above in regards to verify and validate process 482 in FIG. 4. The token 470 separates the token digital signature 504 from LAC 403. Token attribute data 502 is input to verify process 940, along with token digital signature 504 and token public key 480. If the token digital signature 504 is properly verified, the token 470 permits processing to continue. If the token digital signature 504 is not properly verified, the token 470 notifies library 408 that an error has occurred. Library 408 then notifies computer application 402 of the error, and computer application 402 will handle the error. Computer application 402 can notify user 480 of the error, or can attempt to process the error without notifying user 480.

Once token digital signature 504 has been verified, token 470 checks token attribute data 502 against token supplemental enforcement data 477 in validate process 950. This determines whether token 470 is permitted to perform the particular operations designated in token attribute data 502. If the validation fails, data path 960 is not enabled, which will prohibit the use of token 470 by computer application 402.

Figure 10:
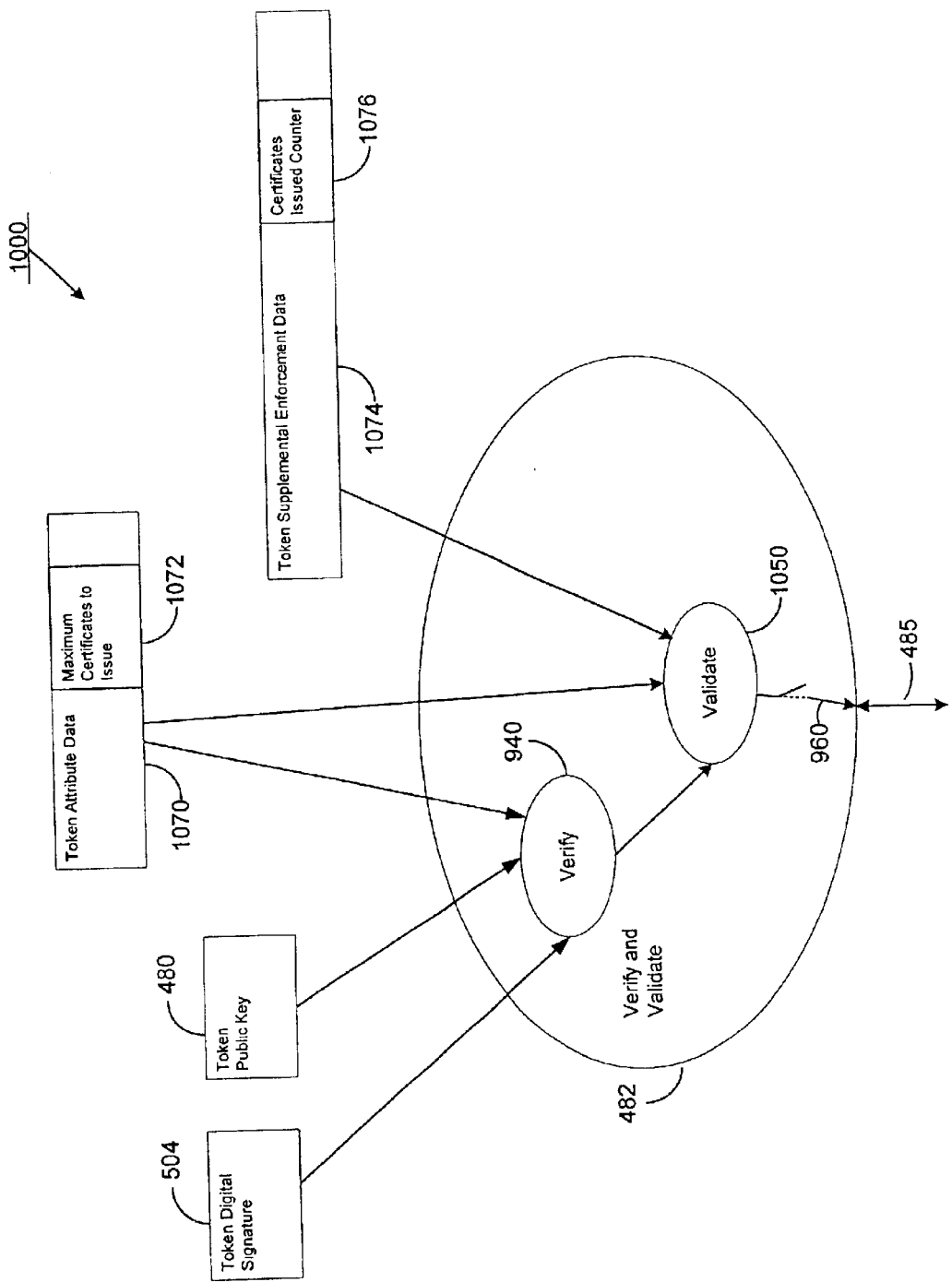
FIG. 10 depicts an example, according to the invention, of a token enforcement process which checks a counter to determine whether or not a certification authority can issue a certificate.

FIG. 10 depicts LAC 1000, according to an embodiment of the invention, which can be used for tracking usage of a particular computing resource. In this embodiment, the LAC 1000 exists in a system at a certification authority (CA) which issues certificates. In FIG. 10, token attribute data 1070 contained in the LAC can contain usage data for a computing resource. This usage data allows the usage of the computing resource to be metered. For example, token attribute data 1070 in FIG. 10 contains a maximum certificates to issue field 1072. Token supplemental enforcement data 1074, which resides in a database that can be maintained outside of a TCB, contains certificates issued counter 1076. Certificates issued counter 1076 reflects the number of certificates that have been issued by the CA. During validate process 1050, maximum certificates to issue field 1072 is compared against certificates issued counter 1076. If certificates issued counter 1076 has exceeded the value in maximum certificates to issue field 1072, further usage of the computing resource will be disallowed.

The check of certificates issued counter 1076 against maximum certificates to issue field 1072 can occur inside of the TCB. Once checked, the TCB would then update certificates issued counter 1076, store the updated value within the TCB, and send the updated certificates issued counter 1076 back to the database. In an alternative embodiment, the updating of the certificates issued counter 1076 can occur external from the TCB.

In another embodiment, the usage data can, for example, correspond to a maximum number of accesses by a computer application to a computing resource. In yet another embodiment, the usage data can, for example, correspond to a maximum number of cryptographic operations that can be performed by a computing resource which provides cryptographic functionality.

Figure 11A:
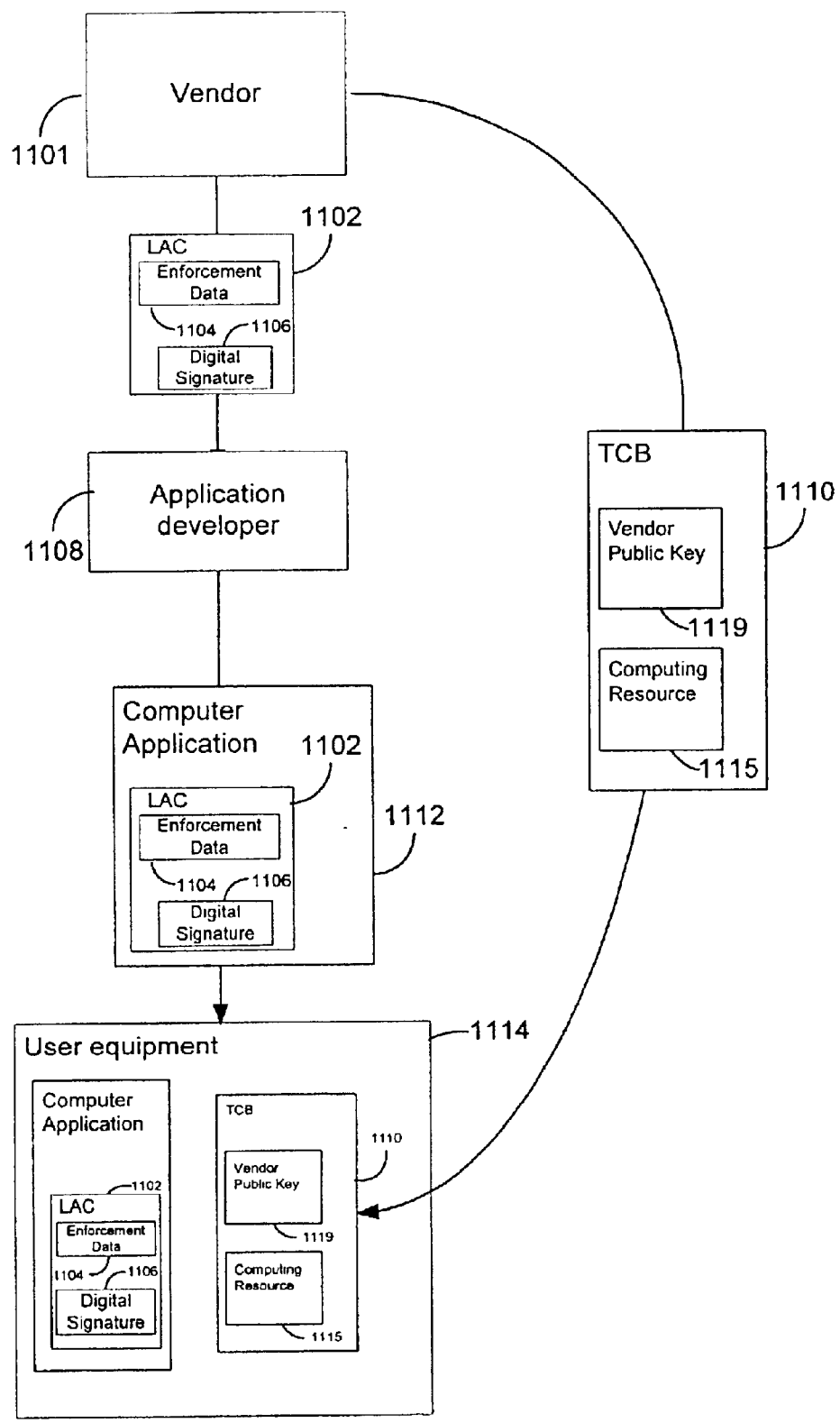
FIG. 11a and FIG. 11b depict two models of licensing attribute certificate implementation, according to the invention.

The embodiments of the LAC described so far represent only a few of many possible models of LAC usage. As the model in FIG. 11a shows, vendor 1101 can distribute LAC 1102 (comprising enforcement data 1104 and digital signature 1106) to application developer 1108. Application developer 1108 creates computer application 1112 into which LAC 1102 is embedded, as previously described. Vendor 1101 also distributes computing resource 1115 and vendor public key 1119 (both contained within TCB 1110) to the user, who installs the TCB 1110 in user equipment 1114. The user also installs computer application 1112, containing LAC 1102, in user equipment 1114. Prior to being able to use computing resource 1115, however, TCB 1110 would need to properly validate LAC 1102 using vendor public key 1119 contained in TCB 1110.

Figure 11B:
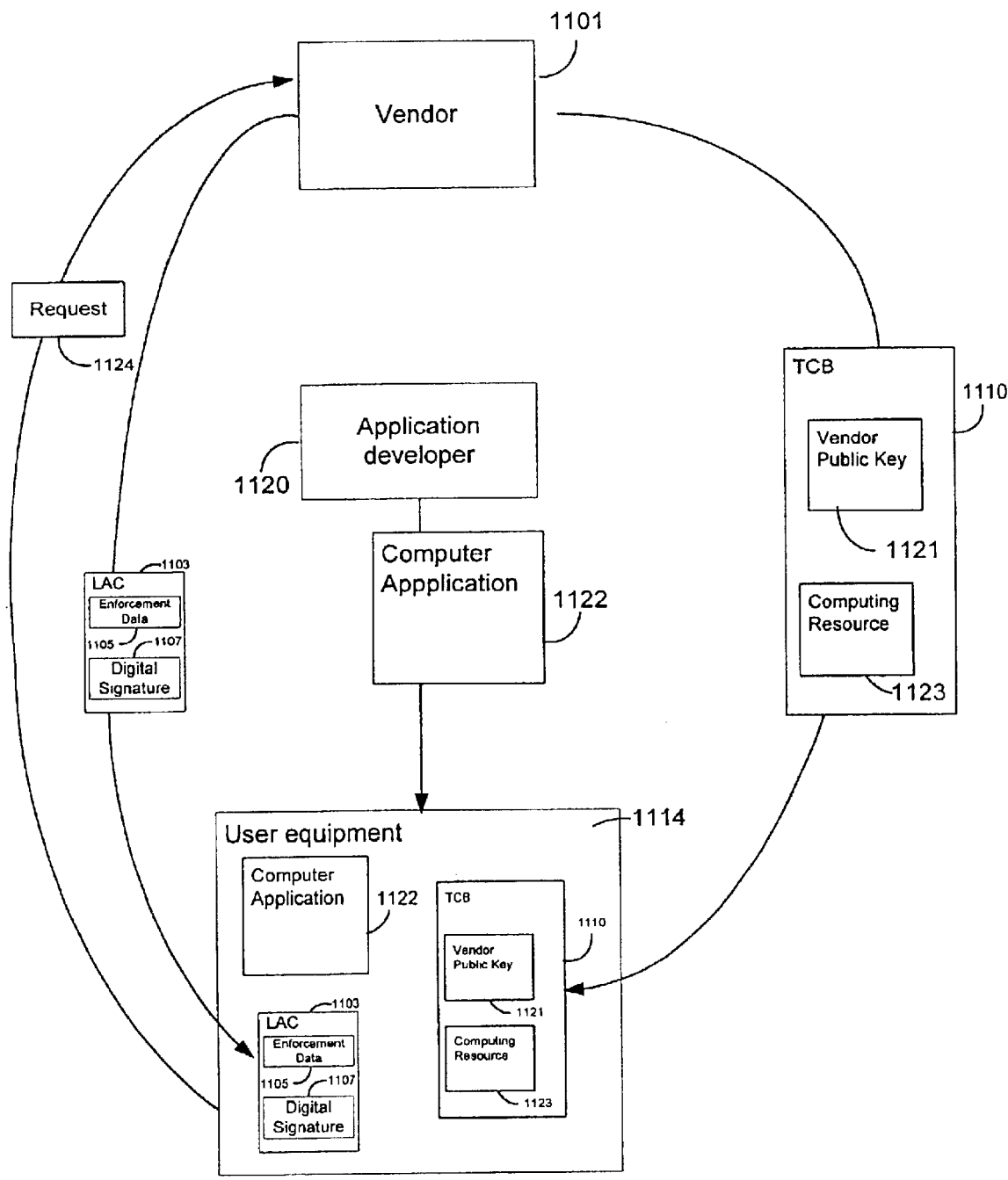

FIG. 11b shows a model which differs somewhat from that shown in FIG. 11a. In FIG. 11b, application developer 1120 creates computer application 1122 and has no interaction at all with vendor 1101. In contrast to the model in FIG. 11a, the user sends request 1124 from user equipment 1114 to vendor 1101. In response, vendor 1101 prepares LAC 1103 and transmits this directly to the user. The user installs both LAC 1103 and TCB 1110 on user equipment 1114, in addition to computer application 1122. In this model, similar to the model shown in FIG. 11a, prior to being able to use computing resource 1123, TCB 1110 must properly validate LAC 1103 using vendor public key 1121.

Although the invention has been described for a licensing attribute certificate used by a CA, it applies to a wide range of computing applications where enforcing authorized usage of resources is desired. For example, usage of computer aided drawing (CAD) software could be enforced with a LAC. In addition, access to a CD-ROM containing data could be enforced with a LAC. Thus, the present invention is not limited to the precise embodiments described above. For example, while a LAC could be compiled with a computer application as described above, a system and method according to the invention could just as easily be implemented in which a LAC exists in a separate file from an executable application. Similarly, other authentication means besides digital signatures could be used. Additionally, the counter discussed in the method for using a LAC to track usage of a resource might be contained within the cryptographic token itself.

It is clear that various changes and modifications may be made to the embodiments which have been described, more specifically by substituting equivalent technical means, without departing from the spirit and scope of the invention. The embodiments presented are illustrative. They are not intended to limit the invention to the specific embodiments described and shown in the attached figures. Instead, the invention is defined by the following claims.

We claim:

1. A method for enforcing access by a computer application to a computing resource controlled by a trusted computing base, comprising the steps of:
   generating enforcement data identifying usage of said computing resource by said computer application;
   embedding said enforcement data in a licensing attribute certificate;
   cryptographically binding said licensing attribute certificate to said computing resource using a private key;
   associating said licensing attribute certificate with said computer application; and
   authenticating in said trusted computing base the use of said computing resource by said computer application using a public key corresponding to said private key.

2. A method as in claim 1 wherein said generating step further comprises generating enforcement data in response to a request message for a licensing attribute certificate received from a user.

3. A method as in claim 2 wherein said generating step is performed by a vendor.

4. A method as in claim 1 wherein said binding step further comprises computing a digital signature on said enforcement data.

5. A method as in claim 4 wherein said generating step further comprises generating library attribute data.

6. A method as in claim 5 wherein said generating step further comprises generating token attribute data.

7. A method as in claim 6 wherein said library attribute data further comprises accessible tokens data and sub-functionality data.

8. A method as in claim 7 wherein said generating step further comprises generating enforcement data corresponding to a particular set of access rights, comprising the steps of:
   determining appropriate content of token attribute data; and
   determining appropriate content of library attribute data.

9. A method as in claim 8 wherein said binding step further comprises:
   computing a second digital signature on said token attribute data; and
   including said second digital signature in said licensing attribute data.

10. A method as in claim 9 wherein the same private key is used to compute said second digital signature as that used to compute said first digital signature.

11. A method as in claim 10 wherein said private key used to compute said first and second digital signatures is a private key of a vendor of a library.

12. A method as in claim 9 wherein a different private key is used to compute said second digital signature from that used to compute said first digital signature.

13. A method as in claim 12 wherein said private key used to compute said second digital signature is the private key of a vendor of said computing resource.

14. A method as in claim 1 wherein said binding step further comprises encrypting said enforcement data with a private key.

15. A method as in claim 1 wherein said associating step further comprises compiling computer application source code with said licensing attribute certificate.

16. A method as in claim 1 wherein said associating step further comprises providing an entry identifying said licensing attribute certificate in a system registry of a computer operating system.

17. A method as in claim 1 wherein said trusted computing base comprises a computer operating system.

18. A method as in claim 1 wherein said trusted computing base comprises a cryptographic token.

19. A method as in claim 18 wherein said binding step further comprises computing a digital signature on said enforcement data.

20. A method as in claim 1 wherein said licensing attribute certificate comprises an attribute certificate in X.509 attribute certificate format.

21. A method as in claim 1 wherein said authenticating step further comprises authenticating with a public key received in X.509 identity certificate format.

22. A method for allowing a trusted computing base to use a licensing attribute certificate to track usage of a computing resource by a computer application, comprising the steps of:
generating usage data regarding usage of said computing resource by said computer application;
embedding said usage data in said licensing attribute certificate;
cryptographically binding said licensing attribute certificate to said computing resource using a private key;
associating said licensing attribute certificate with said computer application;
updating a usage database within said trusted computing base in accordance with the usage of said computing resource by said computer application;
authenticating in said trusted computing base the use of said computing resource by said computer application;
validating said usage database against said usage data for permitted usage of said computing resource by said computer application; and
disallowing usage of said computing resource by said computer application if said validating step fails.

23. A method as in claim 22, wherein said usage data further comprises a maximum number of accesses by said computer application to said computing resource.

24. A method as in claim 22, wherein said usage data further comprises a maximum number of cryptographic operations to be performed by said computing resource.

25. A method as in claim 24 wherein said trusted computing base comprises a cryptographic token.

26. A method as in claim 25, wherein said cryptographic token comprises a PCMCIA card.

27. A method as in claim 25, wherein said cryptographic token comprises a smart card.

28. A system for enforcing access by a computer application to a computing resource controlled by a trusted computing base, comprising:

means for generating enforcement data identifying usage of said computing resource by said computer application;
means for embedding said enforcement data in a licensing attribute certificate;
means for cryptographically binding said licensing attribute certificate to said computing resource using a private key;
means for associating said licensing attribute certificate with said computer application; and
a trusted computing base for authenticating the use of said computing resource by said computer application using a public key corresponding to said private key.

29. A system as in claim 28, wherein said computing resource comprises a cryptographic operation on a cryptographic token.

30. A system as in claim 29 wherein said cryptographic token comprises a PCMCIA card.

31. A system as in claim 29 wherein said cryptographic token comprises a smart card.

32. A system as in claim 28 wherein said trusted computing base comprises a PCMCIA card.

33. A system as in claim 28 wherein said trusted computing base comprises a smart card.

34. A method for creating a licensing attribute certificate for enforcing access by a computer application to a computing resource controlled by a trusted computing base, comprising the steps of:
generating enforcement data identifying usage of said computing resource by said computer application;
embedding said enforcement data in said licensing attribute certificate;
cryptographically binding said licensing attribute certificate to said computing resource using a private key; and
associating said licensing attribute certificate with said computer application.

35. A method as in claim 34 wherein said generating step further comprises generating enforcement data in response to a request message for a licensing attribute certificate received from a user.

36. A method as in claim 35 wherein said generating step is performed by a vendor.

37. A method as in claim 34 wherein said generating step further comprises generating library attribute data.

38. A method as in claim 37 wherein said generating step further comprises generating token attribute data.

39. A method as in claim 38 wherein said library attribute data further comprises accessible tokens data and sub-functionality data.

40. A method as in claim 39 wherein said generating step further comprises generating enforcement data corresponding to a particular set of access rights, comprising the steps of:
determining appropriate content of token attribute data; and
determining appropriate content of library attribute data.

41. A system for creating a licensing attribute certificate for enforcing access by a computer application to a computing resource controlled by a trusted computing base, comprising:
means for generating enforcement data identifying usage of said computing resource by said computer application;

means for embedding said enforcement data in said licensing attribute certificate;

means for cryptographically binding said licensing attribute certificate to said computing resource using a private key; and means for associating said licensing attribute certificate with said computer application.

42. A system as in claim 41 wherein said means for generating said enforcement data further comprises means for responding to a request message for a licensing attribute certificate received from a user.

43. A system as in claim 42 wherein a vendor operates said means for generating said enforcement data.

44. A system as in claim 41 wherein said means for generating said enforcement data further comprises means for generating library attribute data.

45. A method as in claim 44 wherein said means for generating said enforcement data further comprises means for generating token attribute data.

46. A system as in claim 45 wherein said means for generating library attribute data further comprises means for generating accessible tokens data and sub-functionality data.

47. A system as in claim 46 wherein said means for generating said enforcement data further comprises means for generating enforcement data corresponding to a particular set of access rights, comprising:

means for determining appropriate content of token attribute data; and means for determining appropriate content of library attribute data.

* * * * *